United States Patent [19]

Stovall

[11] 4,328,552
[45] May 4, 1982

[54] STATISTICAL CALIBRATION SYSTEM

[76] Inventor: Robert E. Stovall, 17824 Tree Lawn Dr., Ashton, Md. 20702

[21] Appl. No.: 112,982

[22] Filed: Jan. 17, 1980

[51] Int. Cl.³ .............................................. G06F 15/31
[52] U.S. Cl. ................................... 364/554; 364/514; 364/553; 364/571; 343/17.7
[58] Field of Search ............... 364/554, 514, 553, 516, 364/517, 571, 573; 328/142, 143; 343/17.7

[56] References Cited

U.S. PATENT DOCUMENTS

| | | | |
|---|---|---|---|
| 3,199,107 | 8/1965 | Mills | 343/17.7 |
| 3,323,123 | 5/1967 | Hegarty et al. | 343/17.7 |
| 3,361,972 | 1/1968 | Eaves | 325/395 |
| 3,626,168 | 12/1971 | Norsworthy | 364/553 X |
| 3,832,712 | 8/1974 | Goetz et al. | 343/17.7 |
| 3,878,724 | 4/1975 | Allen | 364/571 X |
| 3,887,794 | 6/1975 | Katz et al. | 364/516 X |
| 3,890,618 | 6/1975 | Speiser | 364/516 X |
| 3,903,521 | 9/1975 | Jensen et al. | 343/17.7 |
| 3,938,050 | 2/1976 | Corbett et al. | 364/571 X |
| 3,950,750 | 4/1976 | Churchill et al. | 343/17.7 |
| 3,973,112 | 8/1976 | Sloane | 364/553 |
| 4,003,054 | 1/1977 | Goldstone | 343/17.7 |
| 4,047,153 | 9/1977 | Thirion | 364/514 X |
| 4,053,890 | 10/1977 | Woodson et al. | 343/17.7 |
| 4,117,538 | 9/1978 | Shrader et al. | 364/517 |
| 4,122,529 | 10/1978 | Hoech | 364/553 X |
| 4,138,645 | 2/1979 | Parato | 325/363 |
| 4,141,072 | 2/1979 | Perreault | 364/553 |
| 4,149,120 | 4/1979 | Richter | 364/573 X |

*Primary Examiner*—Edward J. Wise
*Attorney, Agent, or Firm*—Nolte and Nolte

[57] ABSTRACT

A calibration method and apparatus, which may be used for calibration and characterization of nonlinearities in electronic components or systems, functions at all frequencies up to and including ratio frequencies. The system under calibration is driven with a noise signal and the statistical nature of the output is observed, whereupon the system nonlinearities may be statistically inferred with a high degree of accuracy.

11 Claims, 4 Drawing Figures

STATISTICAL CALIBRATION SYSTEM

BACKGROUND OF THE INVENTION

The U.S. Government has rights in this invention pursuant to Contract No. AF 19-628-78-C-002, awarded by the Department of the Air Force.

The present invention relates generally to the measurement and calibration of nonlinearities in electronic components and equipment. These operations are of interest to many sectors of the technical marketplace. For example, test equipment manufacturers, production and quality control engineers and researchers employing electronic equipment all require knowledge of the nonlinearities present in the systems under consideration. Calibration has also become a necessary and increasingly important part of modern radar systems.

Many modern electronics systems operate at intermediate frequencies (IF) and radio frequencies (RF) and, thus, employ units which must translate the signals of interest down to audio or video frequencies. Exemplary of such units are synchronous or logarithmic detectors. These frequency translating units and other system components contain nonlinearities that must be measured and calibrated. Moreover, calibration operations are complicated at IF and RF by the substantial phase shifts present between the input signal and the output signal. These phase shifts cause certain well-known, lower frequency techniques to be essentially useless. Presently, calibration of nonlinearities at or above IF is accomplished by deterministic methods, wherein the system output is observed for a known input.

In the specific example of a radar receiver, whether it operates under square law, logarithmic, or synchronous demodulation, amplitude calibration is frequently achieved by inserting a reference pulse through a bank of precision attenuators, which then increment the input signal over the dynamic range of the system. This is the deterministic approach mentioned above. Nevertheless, this technique will not permit the calibration accuracy to be extended indefinitely, since that implies additional, smaller, and increasingly accurate attenuators, which bring with them the problems associated with cascading a large number of elements, e.g., leakage, unfavorable voltage standing wave ratio (VSWR), etc. Additionally, calibration of nonlinearities can become biased, and thus more complicated at levels which are near and below the system noise level. This is a frequency region where many receivers must operate, and thus conventional calibration techniques are unsatisfactory.

SUMMARY OF THE INVENTION

The present invention provides apparatus and a method involving a statistical calibration technique, wherein the amplitude response function is inferred from the statistical distribution of the output signal, when the input is driven by a random signal having a known distribution. The inventive calibration apparatus and method may be employed for calibration and characterization of nonlinearities in electronic components or systems operating in the range from audio frequencies up to and including radio frequencies. The present invention also acts to calibrate equipment and/or components below the system noise level.

The input and output cumulative probabilities are equated in the present invention, and the system transfer function is derived. Once the system transfer function is known, then the essential calibration information is known about the system and one can then compensate for nonlinearities.

The present invention possesses an inherent capability to improve the accuracy and resolution of the calibration by means of increased measurement periods, while still providing results at near real-time speeds. The accuracy of the inferred transfer function depends upon the number of samples utilized to generate it, and it is then a feature of the present invention to teach the establishment of lower bounds on the number of samples required to achieve a specified accuracy and level of confidence.

Therefore, it is an object of the present invention to provide a method and apparatus for determining nonlinearities of components or electronic apparatus from audio frequencies up to and including radio frequencies.

It is another object of the present invention to provide nonlinearity calibration of components and electronic apparatus which does not require the use of highly calibrated stepped attenuators.

A further object of the present invention is to provide a method and apparatus for calibrating system nonlinearities which employ the statistical approach, not relying upon a knowledge of the instantaneous amplitude of the output of the system under calibration.

The manner in which these and other objects are accomplished by the present invention will be seen from the following detailed description.

DETAILED DESCRIPTION OF THE INVENTION

The present invention provides a statistical calibration technique in which the system amplitude response function is inferred from the statistical distribution of the output signal, when the input is driven by a random signal whose distribution is known. Although any random source of known statistical dependence will function for an input signal, amplifier noise, with its bivariate complex Gaussian dependence, has several advantages. (At baseband, this results in univariate Gaussian noise.) It is an easily derived signal source, and the sum of ambient system noise plus the driving noise signal still equals noise, thus remaining unchanged statistically.

Digital samples of the random output signal Y are used to form the empirical cumulative probability distribution $F_Y(Y)$, necessary for inferring the system nonlinearities. Since the input signal X is Rayleigh amplitude distributed, with cumulative probability distribution $F_X(X)$ of the form:

$$F_X(X) = 1 - \exp(-X^2/2\sigma^2)$$

and mean noise power of $2\sigma^2$, then by equating the input and output cumulative probabilities, it is seen that:

$$X = \sqrt{-2\sigma^2 \ln(1 - F_Y(Y))} \tag{1}$$

Figure 1:
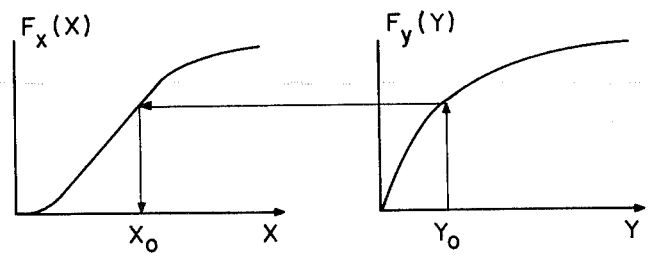
FIG. 1 represents the input/output relationship by plotting an input cumulative distribution on the left and an output cumulative distribution on the right.

This operation of equating the input and output cumulative probabilities, in order to derive the system transfer function, is shown graphically in FIG. 1. The plot on the left represents the known input cumulative distribution, and the plot on the right represents the observed output cumulative distribution.

Referring then to these figures, it may be seen that for any discrete output $Y_0$ it is possible to infer the associated input amplitude $X_0$.

A similar derivation can be followed for synchronous detection, in which the separate in-phase (I) and quadrature (Q) channels are Gaussian distributed. The equations then take the following form:

$$I \text{ or } Q = -\sigma \sqrt{2} \; erfc^{-1}\{2F_Y(Y)\}; F_Y < \tfrac{1}{2} \tag{2}$$

$$I \text{ or } Q = \sigma \sqrt{2} \; erf^{-1}\{2F^Y(Y) - 1\}; F_Y \geq \tfrac{1}{2}$$

where $erf^{-1}\{\;\}$ and $erfc^{-1}\{\;\}$ are the inverse error and complimentary error functions, respectively. While the functional form of equation (2) is not expressed in terms of elementary function as was equation (1), the ready availability of computer routines to derive the error function, and its inverse, make equation (2) just as useful as equation (1).

As indicated hereinabove, the accuracy of the inventive apparatus and method is directly related to the number of output samples used to generate the empirical probability distribution. Therefore, it becomes important to establish lower bounds on the number of samples required to achieve a specific accuracy and level of confidence. The present invention realizes that the maximum deviation of the empirical from the population cumulative distribution is itself described by the Kolmogorov-Smirnov statistic. This permits the user to look up in the Kolmogorov-Smirnov statistic tables to determine the lower limits on the number of samples for a desired accuracy. Thus, a thorough analysis of equation (1) indicates that accuracies shown represented in FIG. 2 are possible.

Figure 2:
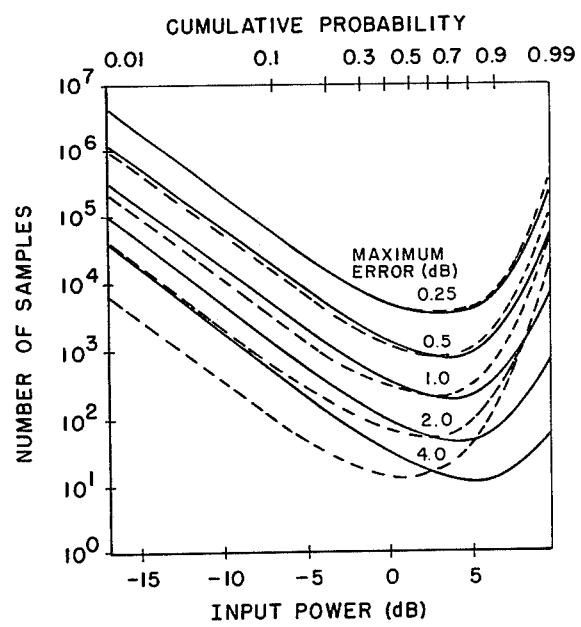
FIG. 2 is a plot of the number of noise samples required for specified accuracy at the 95% confidence level.

Referring then to FIG. 2, it should be noted that as few as only 300,000 samples are required to calibrate system nonlinearities within an accuracy of 0.25 dB over a 20 dB dynamic range, with a confidence level of 95%. FIG. 2 is a plot of several curves indicating the number of noise samples required for the specified accuracy at a 95% confidence level.

Figure 3:
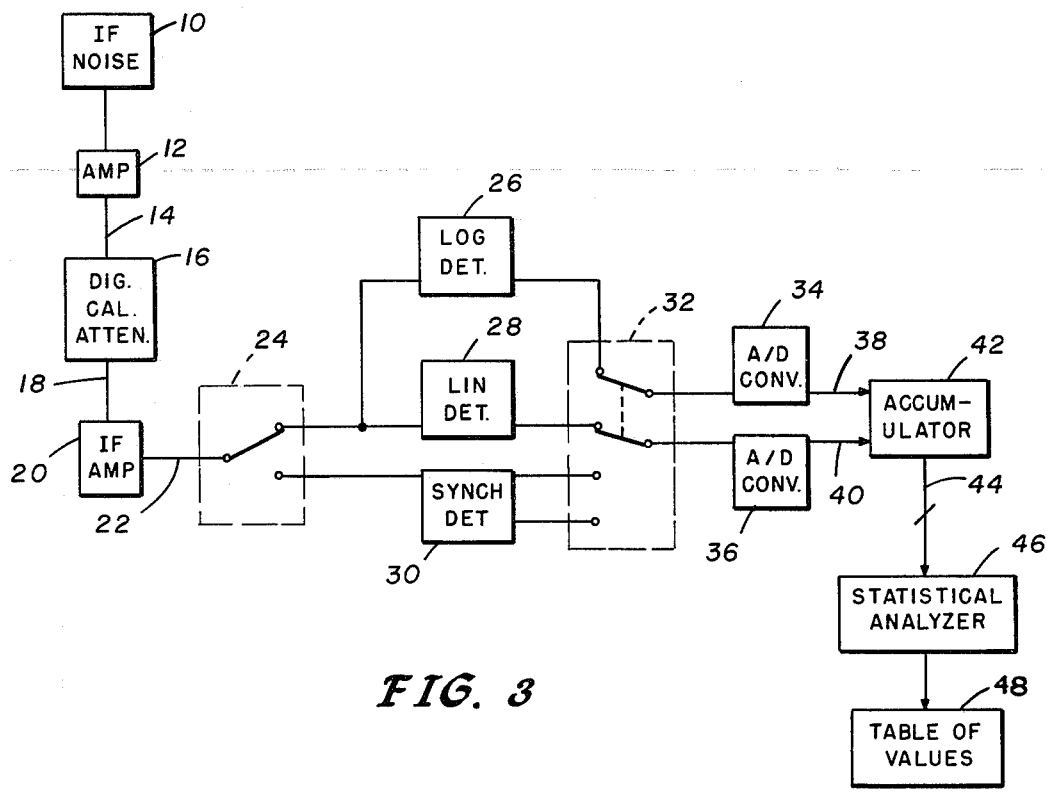
FIG. 3 is a schematic, in block diagram form, of a typical radar calibration configuration.

As indicated above, one example of a typical use of the present invention is to calibrate log, linear, and synchronous detectors in a target location radar system. Referring then to FIG. 3, a simplified block diagram of a typical calibration configuration and radar receiver is shown. It should be understood that this configuration is set forth by way of example only and is only intended to illustrate principal elements involved in the inventive system. Many other system set ups would be possible, while still practicing the inventive method.

A source of IF noise 10 is provided which serves as input to a wide band amplifier 12 to provide a signal on line 14, which will drive the system. It is understood, of course, that in the practice of the inventive method the distribution of the noise signal produced by the IF noise generator 10 is known at the outset. If desired, a digital calibration attenuator 16 may be employed to set the noise power on line 18 at an appropriate level. The signal is then fed to IF amplifier 20 where it is amplified and then fed on line 22 to a switch 24 for connecting the signal either to a log detector 26 and a linear detector 28, or to a synchronous detector 30. The output from the log detector 26, the linear detector 28, and the synchronous detector 30 are fed to a selector switch 32 which connects the appropriate outputs to analog-to-digital convertors, 34 and 36. The analog to digital convertors, 34 and 36, sample and digitize the random output signal produced by the log detector 26, the linear detector 28, and both channels of the synchronous detector 30. The signals appearing on lines 38 and 40 are fed to an accumulator 42, which collects the data base samples. In the present example, the accumulator 42 acts to collect 300,000 samples. The accumulator 42 can comprise an array of registers to receive the various outputs from the A/D convertors, 34 and 36. At the beginning of operation of the present invention, all registers are initialized by setting to zero, and unit incrementation begins.

Assuming that the A/D convertors, 34 and 36, are 8-bit devices, then the output from one of the A/D convertors could be thought of as consisting of 256 discrete signals. The accumulator 42 would then include 256 registers to receive each of these 256 outputs from the A/D convertor. Each time another signal with the same address is produced, the appropriate register contents will be incremented by one. This then represents the statistic or histogram of the output of the device under calibration. The contents of the accumulator 42 are fed on a multi-line 44 to a statistical analyzer unit 46. The statistical analyzer unit 46 may comprise a conventional microprocessor, wherein the accumulator contents are subjected to statistical analysis in the arithmetic logic unit according to the mathematical formula set forth herein. In other words, it generates the empirical cumulative distribution from the histogram stored in the accumulator and performs the input and output statistical association described herein. The output of the statistical analyzer unit 46 is then fed to a table of values unit 48, which simply prints out the ordinates of the transfer function curve or displays it visually or graphically.

Figure 4:
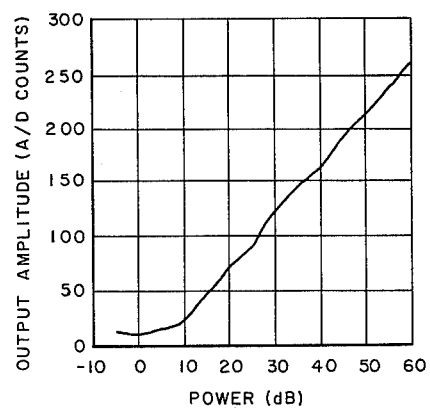
FIG. 4 is a graph representing the transfer function of the logarithmic detector of FIG. 3.

Referring now to FIG. 4, the results of calibrating the log detector 26 of FIG. 3 are shown graphically. The graph of FIG. 4 also shows the logarithmic nature of the transfer function and reveals a slow oscillation about a logarithmic mean. Actually, these oscillations are expected from the cascade of piecewise, somewhat linear detectors which typically make up the conventional log circuit. Additionally, it may be seen in FIG. 4 that the transfer curve does not pass through the origin, and this is a result of an uncompensated DC offset in the output circuit.

The statistical method taught in the present invention provides several distinct advantages over conventional prior art calibration techniques operating at any chosen frequency and, specifically, over those operating at IF and RF. For example, hardware costs and engineering time savings are provided, since very few attenuators are needed and such attenuators need not be expensive calibrated attenuators. Thus, fewer attenuators mean fewer problems with leakage, high VSWR, etc.

Additionally, the inventive technique takes advantage of noise instead of being limited by it. Consequently, the present invention provides a system which can calibrate below the ambient noise levels of the system under test. It is specifically pointed out that such noise limitations are always present in other calibration approaches, while being of no detrimental concern to the inventive statistical technique.

The inventive calibration technique operates in an extremely fast manner. Specifically, in the target location radar system of the above example, a 15 MHZ analog-to-digital convertor could collect 300,000 samples in 50 milliseconds. It should once again be noted that the associated confidence level of such a data collection is 95%. Moreover, even very slow analog-to-digital convertors, e.g., 1 MHZ, can accomplish the data collection in only 300 milliseconds. Thus, since data collection times are short, more samples may be reasonably collected to yield a higher accuracy in accordance with the graph shown in FIG. 2.

As indicated above it is important to note that the present invention provides calibration to components and apparatus operating at any frequency and, specifically, the invention may be used to calibrate components and apparatus operating at baseband and audio frequencies. Moreover, it must be stressed that the present invention serves to calibrate systems below the system noise level.

Once again referring to FIG. 3, it is noted that the output of the analog-to-digital converter represents the system output which forms the desired transfer curve. The structure of FIG. 3 is presented by way of example as representing the inventive method being employed with a radar detector. It should be noted that this system produces a transfer curve which is also a function of the nonlinearities contained in the analog-to-digital converter. In the event that it is desired to calibrate an analog-to-digital converter, certain of the circuit elements in FIG. 3 could be replaced by essentially a short circuit. Specifically, the signal appearing on line 14 which represents the input signal could be fed directly to the analog-to-digital converter 34. Therefore, the transfer function appearing on line 38 would represent the nonlinearities in the analog-to-digital converter plus those present in the wire, which, of course, is a linear element. Thus, the present invention also provides a method of calibrating analog to digital converters. Once again, the frequency over which the converter is calibrated may extend from the audio range up to and including RF. A modification of FIG. 3, wherein certain of the elements are replaced by a straight wire, may be thought of as the generalized form of the present invention.

The only limitation on the inventive system results from statistical errors induced by a noise source having a bandwidth exceeding that of the circuit under test. However, it is pointed out that this limitation is also present in conventional calibration techniques which attempt to calibrate a system utilizing a wide-band pulse. Therefore, the bandwidth limitation in the inventive system is no more significant than that already present.

THEORY OF OPERATION

The inventive statistical calibration technique is one which infers the amplitude response function from the statistical distribution of the output signal, when the input is driven by a random signal whose distribution is known. In other words, the inventive method involves the steps of inputting a random signal having a known amplitude distribution and equating the input and output cumulative probabilities of the unit under consideration and then deriving the system transfer function, which is indicative of the nonlinearities of the system under calibration. Thus, for a memoryless system, the probability that the output signal amplitude will be in the interval $(Y, Y+dY)$ is simply:

$$\text{prob}(Y < y < Y + dY) = f_Y(Y)dY = f_X(X)dx \qquad (3)$$

where,
$Y = g(X)$
$g(X)$ is the unknown system transfer function
$f_X$ and $f_Y$ are the probability densities for the input and output signals, respectively.

A more useful form of equation (3) involves the cumulative probability densities, e.g.

$$F_Y(Y) = F_X(X) = F_Y(g(X)) \qquad (4)$$

where the cumulative probability distribution of a random variable Z is defined as $$F_Z(Z) = \int_{-\infty}^{Z} f_Z(t)dt \qquad (5)$$

For any system, the function $g(X)$ must be invertible (if it is not then for some observed output the input becomes ambiguous), thus we may also write $X = g^{-1}(Y)$ and $$F_X(X) = F_Y(Y) = F_X(g^{-1}(Y)) \qquad (6)$$

Since the cumulative distribution is also invertible, we may solve (6) for the function, $g^{-1}(Y)$, $$X = g^{-1}(Y) = F_X^{-1}(F_Y(Y)) \qquad (7)$$

Equation (7) expresses the unknown inverse transfer function $g^{-1}(Y)$ in terms of the known statistical distribution of the input random variable $F_X$ and the observed statistical distribution of the output random variable $F_Y$. The meaning of equation (7) is depicted in FIGS. 1A and 1B where an output value $Y_0$ is associated with an input amplitude $X_0$ by equating the input and output cumulative distributions.

The above derivation is valid for any distribution of the random variable X, which extends over the expected input dynamic range, including the simplest case where X is uniformly distributed. A candidate statistical signal source based on the uniform distribution might be derived from a digital uniform random number generator followed by a high resolution D/A converter, but such a complication is not necessary when Gaussian system noise provides an equally useful and well-defined random signal source. For Gaussian in-phase and quadrature noise components, the envelope amplitude has the well-known Rayleigh probability density and cumulative distributions, hence:

$$f_X(X) = \frac{X}{\sigma^2} e^{-X^2/2\sigma^2} \qquad (8)$$
$$F_X(X) = 1 - \exp(-X^2/2\sigma^2)$$

where $\sigma$ is the standard deviation of the in-phase and quadrature noise components (for a total noise power of $2\sigma^2$). For the case of noise, then, equation (7) becomes $$X = g^{-1}(Y) = F_X^{-1}(F_Y(Y)) = \sqrt{-2\sigma^2 \ln(1 - F_Y(Y))} \quad (9)$$

The above equation readily describes the unknown inverse transfer function $g^{-1}(Y)$ in terms of the observed output cumulative distribution $F_Y(Y)$. For example, consider an 8-bit A/D converter which samples and quantizes the output Y into 256 quantizing levels. By forming a histogram of the digital samples of Y, when the system is driven by noise, it becomes possible to compute the cumulative distribution $F_Y(Y)$ for $0 \leq Y \leq 255$; thus in accordance with (9) an $X_o$ may be computed for each $Y_o$ and $F_Y(Y_o)$.

The accuracy of the inferred $g^{-1}(Y)$ will depend, of course, on the number of output samples used to generate $F_Y(Y)$; thus it becomes important to establish lower bounds on the number of samples required to achieve a specified accuracy and level of confidence. If the true, or population statistic for the output variable Y is described by the cumulative distribution $F_Y^P(Y)$, then for unit variance of the in-phase and quadrature noise components there results the exact expression for the input amplitude X:

$$X = g^{-1}(Y) = \sqrt{-2\ln(1 - F_Y^P(Y))} \quad (10)$$

If $F_Y^e(Y)$ designates the observed empirical distribution of the output statistic, then the estimate of the input $\hat{X}$ is given as $$\hat{X} = \sqrt{-2\ln(1 - F_Y^e(Y))} =$$
$$\sqrt{-2\ln(1 - F_Y^P(Y) + (F_Y^P(Y) - F_Y^e(Y)))} =$$
$$\sqrt{-2\ln(1 - F_Y^P(Y) \pm d)} \quad ; F_Y^P \gtreqless F_Y^e \quad (11)$$

where d is the positive distance between the population statistic and the empirically obtained statistic. The maximum deviation of the empirical from the population cumulative distribution is itself described by the Kolmogorov-Smirnov statistic. The Kolmogorov-Smirnov statistics, $\delta^+$ and $\delta^-$, as a function of the number of samples N used to generate $F_Y^e(Y)$, are defined as:

$$\delta^+ \triangleq \max_Y \{F_Y^P(Y) - F_Y^e(Y)\}; F_Y^P > F_Y^e \quad (12)$$

$$\delta^- = \max_Y \{(F_Y^e(Y) - F_Y^P(Y))\}; F_Y^P < F_Y^e$$

Both $\delta^+$ and $\delta^-$ have the same distribution, and the db error $\epsilon$ in $\hat{X}$ which results at $$d = \max_Y \{|F_Y^P - F_Y^e|\} \triangleq \delta \quad (13)$$

may be written as $$(F_Y^P, \delta(N, p)) = 20\log_{10}\left(\left|\frac{\hat{X}}{X}\right|_{d=\delta}\right)$$

$$= 10\log_{10}\frac{\ln(1 - F_Y^P \pm \delta)}{\ln(1 - F_Y^P)} \quad ; F_Y^P \gtreqless F_Y^e$$

where $p$ is a specified percentile of the Komogorov-Smirnov statistic. For a specified confidence level $p$ and a specified db error bound $\epsilon$, the above equation may be solved for the required number of samples N.

The results of solving the equation as a function of $F_Y^P(Y)$ for several accuracy bounds and one confidence level are presented in FIG. 2. Since the cumulative probability is directly related to input power, the abscissa is also scaled in dB. FIG. 2 shows the number of noise samples required to achieve certain accuracies between specified percentiles (or input power levels) 95% of the time this test is conducted. Two plots are shown for each error bound corresponding to $F_Y^P \gtreqless F_Y^e$. These plots imply that to the limit of the assumptions, it is possible to increase indefinitely the accuracy or dynamic range, or both, as more samples are used to derive the transfer curve. Similar sample bounds may be derived for different confidence levels.

The above description of the present invention is presented by way of example only and is not intended to limit the scope thereof, except as set forth in the appended claims.

What is claimed is:

1. A method for determining nonlinearities of a system having undetermined nonlinearities in the system output relative to the system input, comprising the steps of:

producing a random amplitude input signal for the determined system having a statistical distribution which is known;

feeding the random amplitude signal into the undetermined system;

determining the probability density of the random output signal of the undetermined system;

obtaining the cumulative probability distribution of the output signal from the probability density of the random output of the undetermined system;

equating the cumulative probability distribution of the input random signal and the cumulative probability distribution of the output signal from the undetermined system; and deriving the system amplitude transfer function representing the unknown nonlinearities of the system from the results of equating the cumulative probabilities of the input and output signals, thereby determining the nonlinearities of the undetermined system.

2. The method of claim 1, wherein the step of producing a random amplitude input signal having a statistical distribution which is known includes the step of producing a noise signal having an exponential amplitude distribution.

3. The method of claim 2, wherein the bandwidth of the undetermined system is known, including the further step of causing the produced noise signal having a statistical distribution which is known to have a bandwidth narrower than that of the undetermined system.

4. The method of claim 1, wherein the step of feeding the random amplitude signal to the input of the undetermined system includes the further step of attenuating the random amplitude input signal before feeding it to the undetermined system.

5. The method of claim 1, wherein the step of obtaining the probability density of the output signal of the undetermined system comprises the step of obtaining the histogram of the output signal.

6. The method of claim 5, wherein the step of obtaining the histogram of the output random signal from the undetermined system includes the step of sampling the output signal from the undetermined system.

7. The method of claim 1, including the further step of digitizing the output signal from the undetermined system and obtaining the histogram from this digitized output signal.

8. The method of claim 7, wherein the step of obtaining the cumulative probability of the output signal of the undetermined system includes the step of deriving the cumulative probability distribution from the obtained histogram.

9. Apparatus for determining in the form of a transfer function the nonlinearities of a system having undetermined nonlinearities at its output relative to its input, comprising means for producing a random amplitude input signal to the undetermined system, said random amplitude signal having a known statistical distribution;

means for feeding the random signal to the input of the undetermined system;

analog-to-digital converter means connected to receive the output signal from the undetermined system for digitizing same; and means for equating the cumulative probabilities of the random amplitude input signal and the digitized output signal from the undetermined system, whereby the system amplitude transfer function of the undetermined system is produced by said means for equating and represents the nonlinearities of the system.

10. The apparatus of claim 9, wherein said means for producing the random amplitude input signal having a known statistical distribution includes means for producing a noise signal of known Gaussian distribution.

11. The apparatus of claim 9, wherein said means for equating the cumulative probabilities includes accumulator means for receiving the output of said analog-to-digital convertor means and for accumulating same in an array of register means, and analyzer means including a table of values unit for performing a functional transformation on the elements contained in the accumulator to derive the amplitude transfer function.

* * * * *